United States Patent
Hsu et al.

(10) Patent No.: US 8,406,420 B2
(45) Date of Patent: Mar. 26, 2013

(54) MAGNETIC-PUSH SLIDE COVER DRIVING DEVICE

(75) Inventors: An Szu Hsu, New Taipei (TW); Chien Nan Tsai, New Taipei (TW)

(73) Assignee: First Dome Corporation, New Taipei (TW)

( * ) Notice: Subject to any disclaimer, the term of this patent is extended or adjusted under 35 U.S.C. 154(b) by 109 days.

(21) Appl. No.: 13/167,835

(22) Filed: Jun. 24, 2011

(65) Prior Publication Data

US 2012/0324794 A1 Dec. 27, 2012

(51) Int. Cl.
*H04M 1/00* (2006.01)
*H04M 9/00* (2006.01)

(52) U.S. Cl. .................. 379/433.12; 455/575.4

(58) Field of Classification Search ............ 379/433.11, 379/433.12; 455/575.4; 361/679.39, 679.27, 361/679.13, 679.56; 16/320, 327–331
See application file for complete search history.

(56) References Cited

U.S. PATENT DOCUMENTS

| 2009/0149230 A1* | 6/2009 | Ruan .......................... 455/575.4 |
| 2009/0168339 A1* | 7/2009 | Lee ........................... 361/679.56 |
| 2010/0159993 A1* | 6/2010 | Davidson et al. ............. 455/566 |
| 2010/0234080 A1* | 9/2010 | Holman et al. ............. 455/575.4 |

* cited by examiner

*Primary Examiner* — Tuan D Nguyen
(74) *Attorney, Agent, or Firm* — Rosenberg, Klein & Lee

(57) ABSTRACT

A magnetic-push slide cover driving device includes a slide seat having at least one slide guide section, a base seat connected on the slide guide section and reciprocally slidable along the slide guide section, at least one middle magnetic body disposed at a middle section of the base seat, and two movable members respectively pivotally disposed at middle sections of two sides of the slide seat. The movable members respectively have two opposite sides. The middle magnetic body is slidable between the opposite sides along with the base seat. Multiple magnetic bodies are arranged on each of the opposite sides. The magnetic bodies on the same side are such arranged that the poles of the same polarity are directed in the same direction. Accordingly, at a later stage of opening process of a slide cover, the magnetic-push slide cover driving device provides a push aid force for the slide cover.

16 Claims, 5 Drawing Sheets

MAGNETIC-PUSH SLIDE COVER DRIVING DEVICE

BACKGROUND OF THE INVENTION

1. Field of the Invention

The present invention relates generally to a magnetic-push slide cover driving device, which is able to lower frictional resistance against the operation and minimize the wear of the components. Also, the magnetic-push slide cover driving device is able to provide push aid force for the slide cover.

2. Description of the Related Art

In the current market, various slide cover structures have been developed and applied to different electronic devices. For example, Taiwanese Patent Publication No. 1328088 discloses a slide module and a portable electronic device adopting the slide module. The slide module includes a fixed system and a movable system. A fixed frame is fixedly connected to the fixed system and a movable frame is fixedly connected to the movable system. Two reverse hook sections are disposed on two sides of the fixed frame. The lateral edges of the movable frame are fitted and received in the reverse hook sections, whereby the movable system can be moved relative to the fixed system between a first position and a second position.

In the above structure, the hook sections of the fixed frame are in face contact with the lateral edges of the movable frame. Therefore, there is a greater friction between these components to affect the sliding movement thereof. To solve this problem, a proper gap is generally preserved between the hook sections of the fixed frame and the lateral edges of the movable frame to reduce the frictional resistance against the sliding movement. Such structure is practically applicable to a small-size electronic product such as cellular phone, handheld game machine and personal digital assistant (PDA). However, such structure can be hardly applied to a large-size electronic product such as a laptop computer or a tablet computer. This is because the movable system will have a heavier weight and it is necessary to move the movable system through a longer distance. When applying a push force to one single side of the movable system, the movable system is very likely to be biased. This will affect the smoothness of the sliding movement of the movable system. In some more serious cases, the movable system may be stuck with no possibility of moving. This will shorten the lifetime of the product and increase the ratio of defective products.

Therefore, it has become a topic how to more conveniently operate the movable system (slide cover mechanism) in accordance with the requirement of humanization without affecting the function of the product.

SUMMARY OF THE INVENTION

It is therefore a primary object of the present invention to provide a magnetic-push slide cover driving device, which is able to provide a proper resistance and a push aid force during sliding of the slide seat relative to the base seat to facilitate use.

It is a further object of the present invention to provide the above magnetic-push slide cover driving device, which is able to lower frictional resistance against sliding of the slide seat relative to the base seat so as to achieve better driving efficiency.

It is still a further object of the present invention to provide the above magnetic-push slide cover driving device, which is able to minimize the wear of the components due to contact friction so as to prolong lifetime of the product.

To achieve the above and other objects, the magnetic-push slide cover driving device of the present invention includes: a slide seat having at least one slide guide section, two pivot pins being respectively disposed at middle sections of two sides of the slide seat; a base seat connected on the slide guide section and reciprocally slidable along the slide guide section; two movable members respectively pivotally disposed on the pivot pins, the movable members respectively having two opposite sides; at least two magnetic bodies respectively disposed on the opposite sides of the movable members with the poles of different polarities facing each other; and at least one middle magnetic body disposed at a middle section of the base seat and slidable between the opposite sides of the movable members along with the base seat. The middle magnetic body is such positioned that the adjacent poles of the middle magnetic body and the magnetic bodies respectively disposed on the opposite sides have the same polarity.

In the above magnetic-push slide cover driving device, multiple magnetic bodies are arranged on each of the opposite sides of the movable members. The magnetic bodies on the same side being such arranged that the poles of the same polarity are directed in the same direction.

In the above magnetic-push slide cover driving device, a magnetically permeable spacer plate is disposed between each two adjacent magnetic bodies.

In the above magnetic-push slide cover driving device, the opposite sides of the movable members are formed with multiple locating notches. The magnetically permeable spacer plates are respectively inlaid and located in the locating notches.

In the above magnetic-push slide cover driving device, each of the movable members is formed with a pinhole. The pivot pins are fitted in the pinholes.

In the above magnetic-push slide cover driving device, a low-friction bushing is disposed in each pinhole around the pivot pin.

In the above magnetic-push slide cover driving device, two slide guide sections are disposed on the slide seat in parallel to each other. The base seat has two connection sections, which can be fitted on the slide guide sections.

The present invention can be best understood through the following description and accompanying drawings, wherein:

DETAILED DESCRIPTION OF THE PREFERRED EMBODIMENTS

Figure 1:
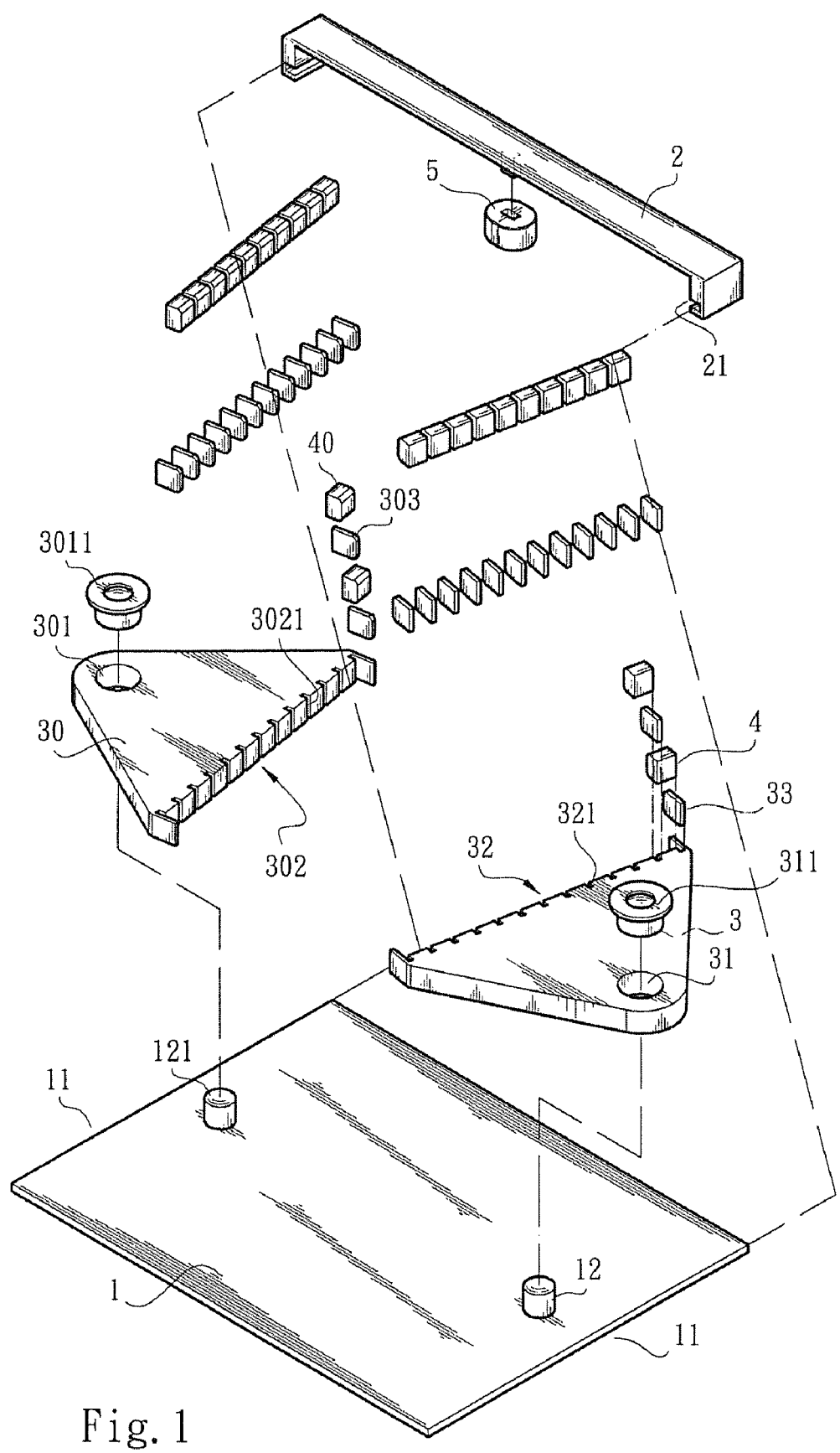
FIG. 1 is a perspective exploded view of the present invention.
Figure 2:
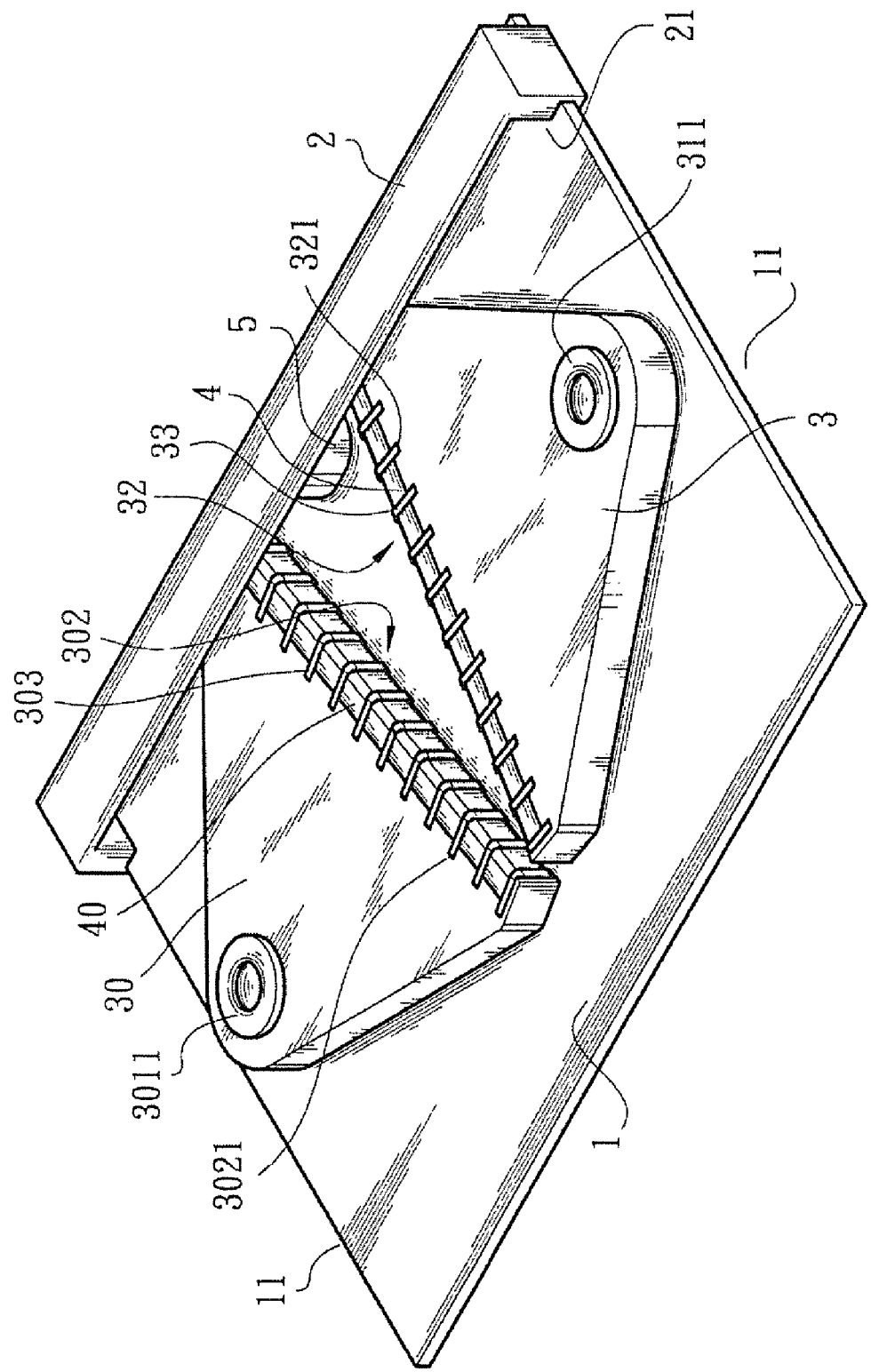
FIG. 2 is a perspective assembled view of the present invention.

Please refer to FIGS. 1 and 2. The present invention includes a slide seat 1, a base seat 2, two movable members 3, 30, multiple magnetic bodies 4, 40 and at least one middle magnetic body 5. The slide seat 1 has at least one slide guide section 11, (preferably two slide guide sections 11 arranged on two sides of the slide seat 1 in parallel to each other). Two pivot pins 12, 121 are respectively disposed at the middle sections of two sides of the slide seat 1. The base seat 2 has connection sections 21, which can be fitted on the slide guide sections 11, whereby the base seat 2 can be reciprocally slid along the slide guide sections 11. The movable members 3, 30 are respectively formed with pinholes 31, 301 in which the pivot pins 12, 121 can be fitted. The low-friction bushings 311, 3011 are disposed in each pinhole 31, 301 around the pivot pins 12, 121 as necessary. Accordingly, the movable members 3, 30 can be respectively pivotally disposed on the pivot pins 12, 121. The movable members 3, 30 respectively have opposite sides 32, 302. The opposite sides 32, 302 are formed with multiple locating notches 321, 3021. Multiple magnetically permeable spacer plates 33, 303 are respectively inlaid in the locating notches 321, 3021. Multiple magnetic bodies 4 are respectively arranged between the spacer plates 33 of the opposite side 32 with the poles of the same polarity directed in the same direction. Multiple magnetic bodies 40 are respectively arranged between the spacer plates 303 of the opposite side 302 with the poles of the same polarity directed in the same direction. In addition, the multiple magnetic bodies 4, 40 respectively arranged on the opposite sides 32, 302 are positioned with the poles of different polarities facing each other. Accordingly, the magnetic bodies 4, 40 magnetically attract each other. The middle magnetic body 5 is disposed at a middle section of the base seat 2 and slidable between the opposite sides 32, 302 of the movable members 3, 30 along with the base seat 2. The middle magnetic body 5 is such positioned that the adjacent poles of the middle magnetic body 5 and the magnetic bodies 4, 40 respectively arranged on the opposite sides 32, 302 have the same polarity. Therefore, the middle magnetic body 5 and the multiple magnetic bodies 4, 40 repel each other.

Figure 3:
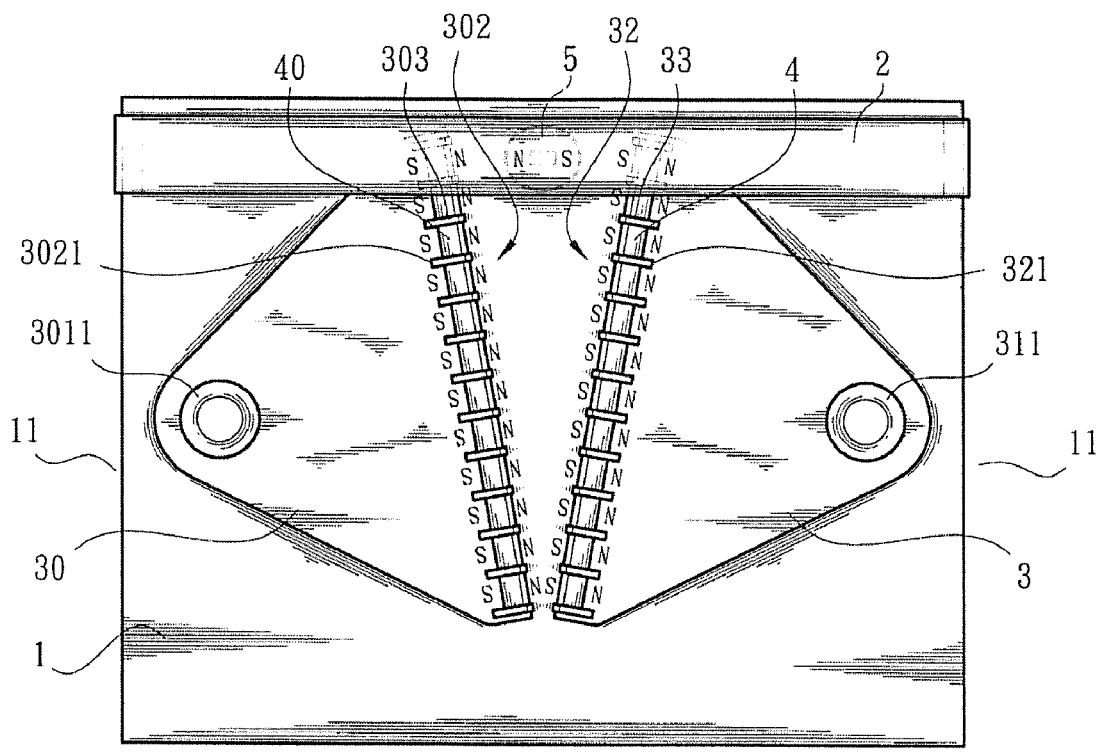
FIG. 3 is a plane view of the present invention, showing the operation thereof at a first stage.

Please refer to FIGS. 3 to 7. In practice, the base seat 2 is connectable with the main body of an electronic product (such as a cellular phone or a PDA), while the slide seat 1 is connectable with a slide cover of the electronic product. When the slide cover covers the main body, the base seat 2 is positioned at a start end of the slide guide section 11 of the slide seat 1 (as shown in FIG. 3). At this time, under the repulsion between the adjacent poles of the middle magnetic body 5 and the magnetic bodies 4, 40 on the opposite sides 32, 302 with the same polarity and due to the cooperative attraction between the opposite poles of the magnetic bodies 4, 40 at the other ends of the opposite sides 32, 302 with the different polarities, the movable members 3, 30 keep the base seat 2 positioned at the start end of the slide guide section 11.

Figure 4:
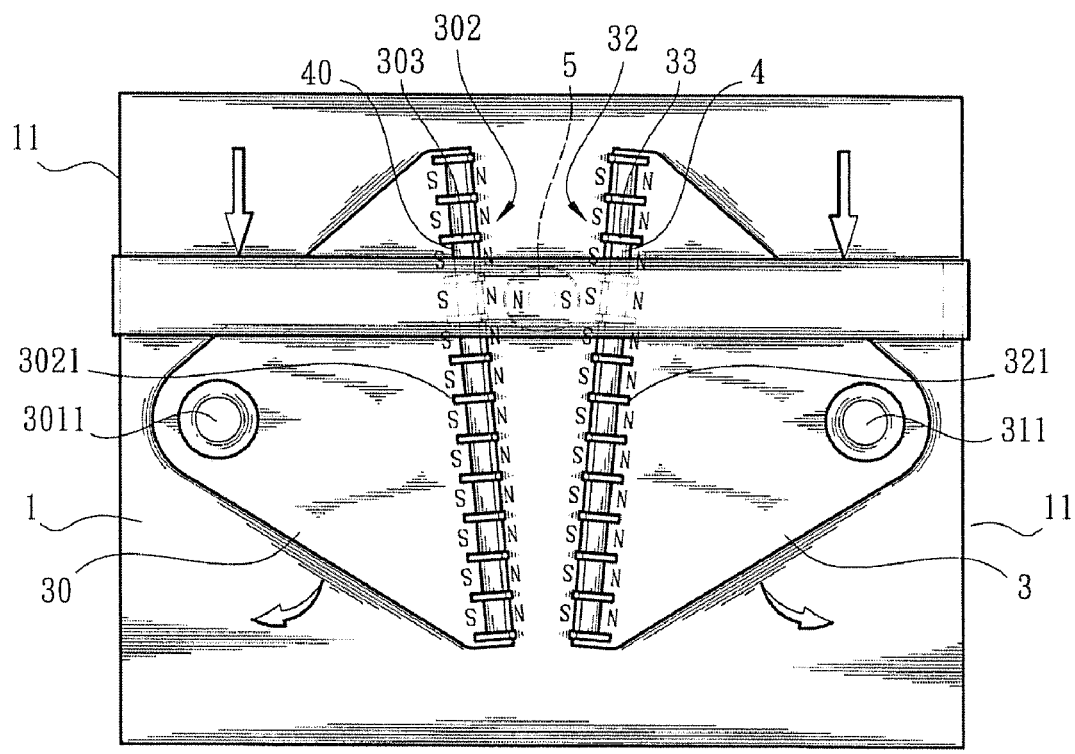
FIG. 4 is a plane view of the present invention, showing the operation thereof at a second stage.
Figure 5:
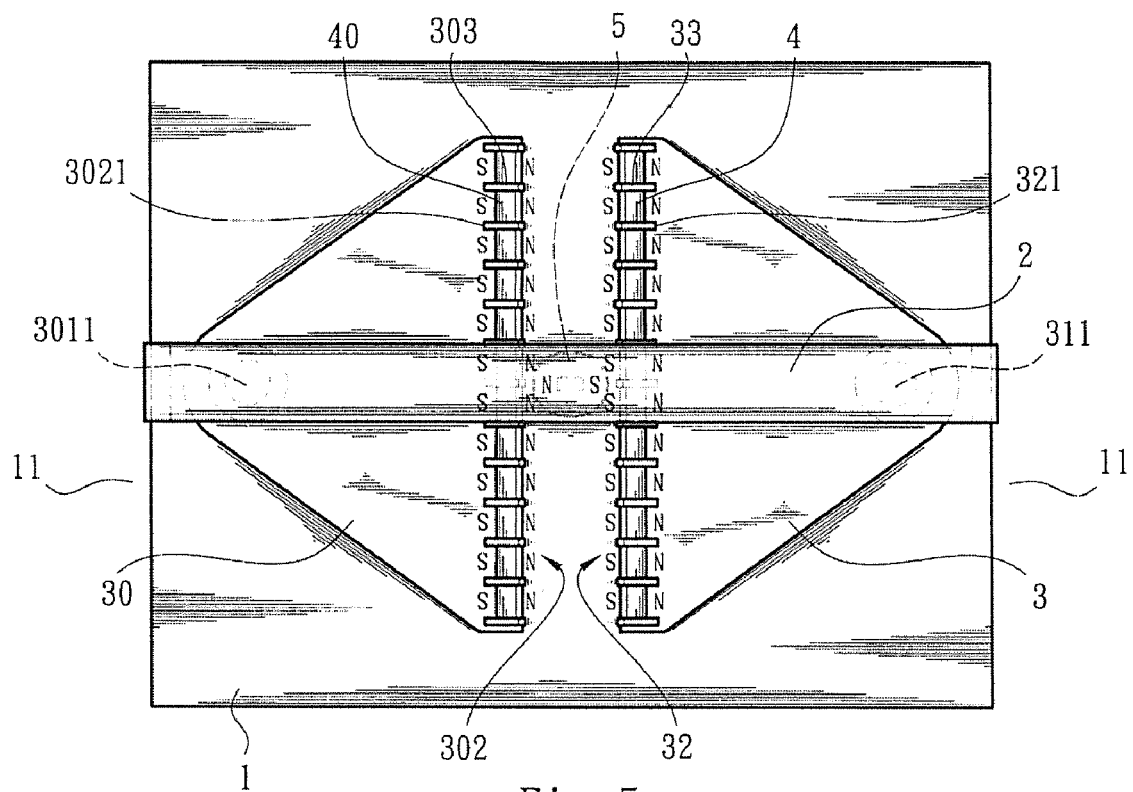
FIG. 5 is a plane view of the present invention, showing the operation thereof at a third stage.
Figure 6:
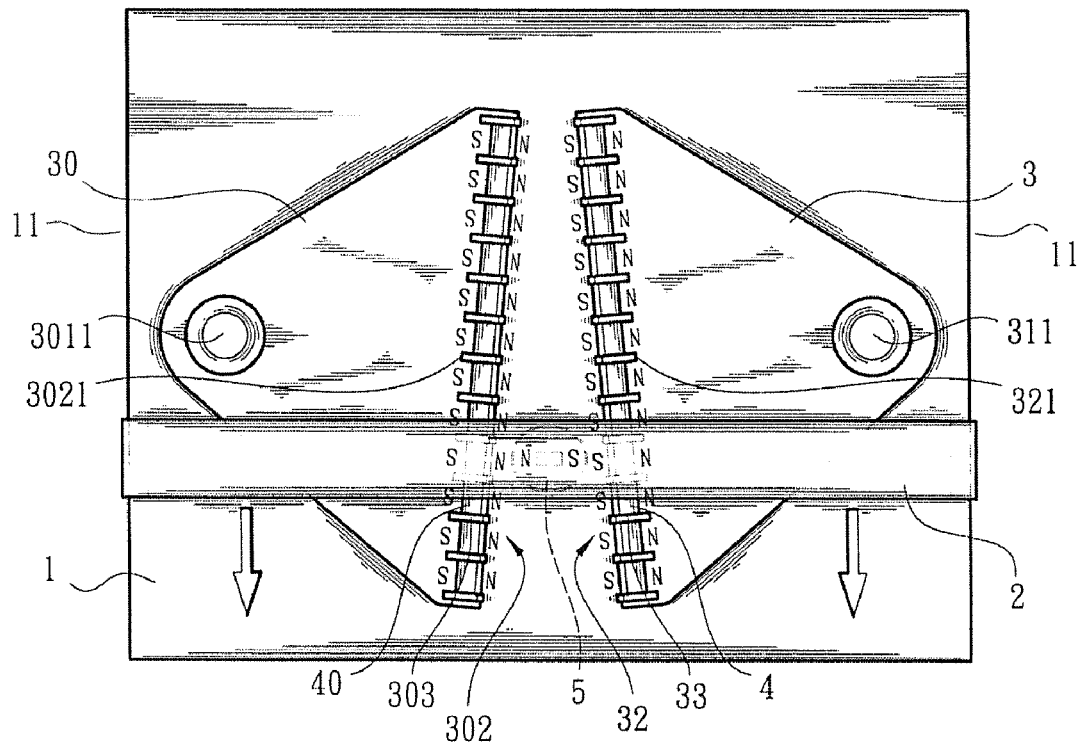
FIG. 6 is a plane view of the present invention, showing the operation thereof at a fourth stage.
Figure 7:
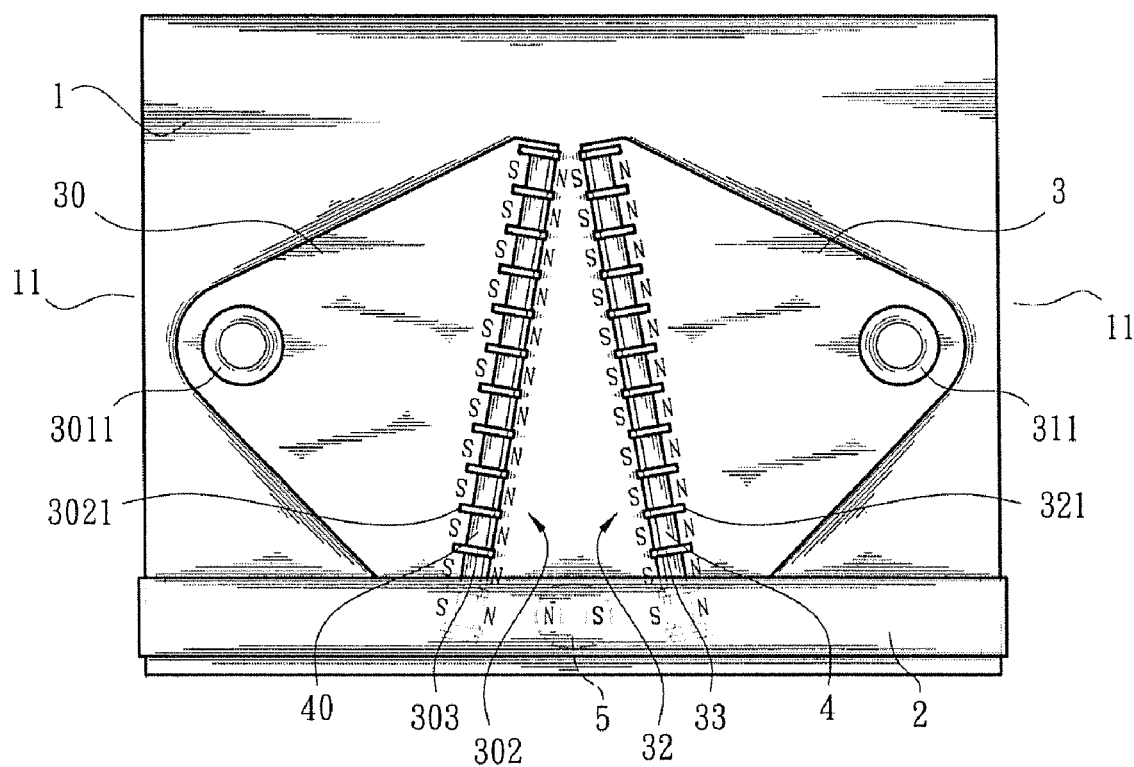
FIG. 7 is a plane view of the present invention, showing the operation thereof at a fifth stage.

In use, when the slide cover is pushed open, the slide seat 1 is driven to slide relative to the base seat 2. At this time, the middle magnetic body 5 is slid toward the middle sections of the opposite sides 32, 302 of the movable members 3, 30 along with the base seat 2. During the sliding movement, under the repulsion between the adjacent poles of the middle magnetic body 5 and the magnetic bodies 4, 40 beside the middle magnetic body 5 with the same polarity, the movable members 3, 30 are pivotally rotated in reverse directions (as shown in FIG. 4). When the middle magnetic body 5 slides to a position between the middle sections of the opposite sides 32, 302 along with the base seat 2, the opposite sides 32, 302 of the movable members 3, 30 are just kept in parallel to each other in a balanced state (as shown in FIG. 5). After the middle magnetic body 5 passes through the middle sections of the opposite sides 32, 302 along with the base seat 2, the movable members 3, 30 are continuously pivotally rotated in reverse directions and the magnetic bodies 4, 40 at the start end gradually get closer to each other. At this time, the attraction between the magnetic bodies 4, 40 gradually increases. In the meantime, the other ends of the opposite sides 32, 302 distal from the start end are gradually moved away from each other. Under such circumstance, the middle magnetic body 5 is forced to drivingly inertly move the base seat 2 away from the start end (as shown in FIG. 6) until the slide cover is fully opened. After the slide cover is fully opened, the middle magnetic body 5 is kept located at the other ends of the opposite sides 32, 302 distal from the start end as shown in FIG. 7. In this case, the slide cover is kept in an opened state.

According to the above arrangement, at the later stage of the opening process of the slide cover, a push aid force is provided for the slide cover to facilitate the use of the slide cover. Moreover, the above structure has no frictional part except the movable members 3, 30 and the pivot pins 12, 121. Therefore, the frictional resistance against the operation is effectively lowered and the wear of the components is minimized. Accordingly, the slide cover can be more easily driven and pushed and the lifetime of the product is prolonged.

Alternatively, in the above structure, the multiple magnetic bodies 4, 40 and spacer plates 33, 303 can be replaced with two elongated magnetic bodies (with a length equal to that of the opposite sides 32, 302). This can simplify the structure, while achieving the same driving effect.

In conclusion, the magnetic-push slide cover driving device of the present invention is able to lower the frictional resistance against the operation and minimize the wear of the components. Also, the magnetic-push slide cover driving device of the present invention is able to provide resistance and push aid force for the slide cover.

The above embodiments are only used to illustrate the present invention, not intended to limit the scope thereof. Many modifications of the above embodiments can be made without departing from the spirit of the present invention.

What is claimed is:
1. A magnetic-push slide cover driving device comprising:
    a slide seat having at least one slide guide section, two pivot pins being respectively disposed at middle sections of two sides of the slide seat;
    a base seat connected on the slide guide section and reciprocally slidable along the slide guide section;
    two movable members respectively pivotally disposed on the pivot pins, the movable members respectively having two opposite sides;
    at least two magnetic bodies respectively disposed on the opposite sides of the movable members with the poles of different polarities facing each other; and
    at least one middle magnetic body disposed at a middle section of the base seat and slidable between the opposite sides of the movable members along with the base seat, the middle magnetic body being such positioned that the adjacent poles of the middle magnetic body and the magnetic bodies respectively disposed on the opposite sides have the same polarity.
2. The magnetic-push slide cover driving device as claimed in claim 1, wherein multiple magnetic bodies are arranged on each of the opposite sides of the movable members, the magnetic bodies on the same side being such arranged that the poles of the same polarity are directed in the same direction.
3. The magnetic-push slide cover driving device as claimed in claim 2, wherein a magnetically permeable spacer plate is disposed between each two adjacent magnetic bodies.
4. The magnetic-push slide cover driving device as claimed in claim 3, wherein the opposite sides of the movable members are formed with multiple locating notches, the magneti- cally permeable spacer plates being respectively inlaid and located in the locating notches.

5. The magnetic-push slide cover driving device as claimed in claim 1, wherein each of the movable members is formed with a pinhole, the pivot pins being fitted in the pinholes.

6. The magnetic-push slide cover driving device as claimed in claim 2, wherein each of the movable members is formed with a pinhole, the pivot pins being fitted in the pinholes.

7. The magnetic-push slide cover driving device as claimed in claim 3, wherein each of the movable members is formed with a pinhole, the pivot pins being fitted in the pinholes.

8. The magnetic-push slide cover driving device as claimed in claim 4, wherein each of the movable members is formed with a pinhole, the pivot pins being fitted in the pinholes.

9. The magnetic-push slide cover driving device as claimed in claim 5, wherein a low-friction bushing is disposed in each pinhole around the pivot pin.

10. The magnetic-push slide cover driving device as claimed in claim 6, wherein a low-friction bushing is disposed in each pinhole around the pivot pin.

11. The magnetic-push slide cover driving device as claimed in claim 7, wherein a low-friction bushing is disposed in each pinhole around the pivot pin.

12. The magnetic-push slide cover driving device as claimed in claim 8, wherein a low-friction bushing is disposed in each pinhole around the pivot pin.

13. The magnetic-push slide cover driving device as claimed in claim 1, wherein two slide guide sections are disposed on the slide seat in parallel to each other, the base seat having two connection sections, which can be fitted on the slide guide sections.

14. The magnetic-push slide cover driving device as claimed in claim 2, wherein two slide guide sections are disposed on the slide seat in parallel to each other, the base seat having two connection sections, which can be fitted on the slide guide sections.

15. The magnetic-push slide cover driving device as claimed in claim 3, wherein two slide guide sections are disposed on the slide seat in parallel to each other, the base seat having two connection sections, which can be fitted on the slide guide sections.

16. The magnetic-push slide cover driving device as claimed in claim 4, wherein two slide guide sections are disposed on the slide seat in parallel to each other, the base seat having two connection sections, which can be fitted on the slide guide sections.

* * * * *